United States Patent [19]
Fantone

[11] Patent Number: 5,589,978
[45] Date of Patent: Dec. 31, 1996

[54] DUAL-PATH OPTICAL SYSTEM

[75] Inventor: Stephen D. Fantone, Lynnfield, Mass.

[73] Assignee: Mobi Corporation, Lynnfield, Mass.

[21] Appl. No.: 487,837

[22] Filed: Jun. 7, 1995

Related U.S. Application Data

[62] Division of Ser. No. 118,881, Sep. 9, 1993, Pat. No. 5,469,293.

[51] Int. Cl.⁶ .............................. G02B 23/00; G02B 23/08
[52] U.S. Cl. ........................... 359/412; 359/407; 359/411
[58] Field of Search .......................... 359/362, 407–419, 359/850, 855–857, 554–557

[56] References Cited

U.S. PATENT DOCUMENTS

| | | | |
|---|---|---|---|
| 1,679,661 | 8/1928 | Hugershoff | 359/472 |
| 2,364,844 | 12/1944 | Fuog | 351/201 |
| 2,895,374 | 7/1959 | Price | 353/8 |
| 3,162,715 | 12/1964 | Scidmore | 359/404 |
| 3,409,343 | 11/1968 | Zapp | 359/431 |
| 3,418,034 | 12/1968 | Ambrose | 359/472 |
| 3,622,232 | 11/1971 | Munnerlyn | 359/861 |
| 3,915,550 | 10/1975 | Humphrey | 359/556 |
| 3,947,095 | 3/1976 | Moultrie | 359/505 |
| 3,985,421 | 10/1976 | Beecher | 359/414 |
| 4,013,340 | 3/1977 | Mukai et al. | 359/417 |
| 4,126,876 | 11/1978 | Jones | 354/112 |
| 4,178,561 | 12/1979 | Hon et al. | 359/215 |
| 4,268,111 | 5/1981 | Green et al. | 359/408 |
| 4,605,290 | 8/1986 | Burns | 359/858 |
| 4,662,731 | 5/1987 | Robert et al. | 351/214 |
| 5,155,517 | 10/1992 | Betensky et al. | 354/222 |
| 5,204,774 | 4/1993 | Owen et al. | 359/418 |
| 5,469,293 | 11/1995 | Fantone | 359/365 |

FOREIGN PATENT DOCUMENTS 49011 11/1990 Japan ................................ 359/412

OTHER PUBLICATIONS

"Ophres", Hecht et al, Addison–Wesley publishing Company, pp. 148–149, 1974.
Search Report From PCT/US94/10115.
Written Opinion From PCT/US94/10115.

Primary Examiner—Thong Nguyen
Attorney, Agent, or Firm—Francis J. Caufield

[57] ABSTRACT

Pseudoscopic, dual-path optical systems employing plane mirror arrangements for cross coupling the optical paths to reverse the left and right perspectives of object space are provided. Advantageously, the cross coupled path arrangements permit the systems to be manufactured inexpensively because low-cost reflective components can be used and assembled with alignment requirements that are significantly relaxed compared with customary requirements found in uncoupled systems utilizing high-cost prisms or mirror arrangements for similar purposes.

7 Claims, 7 Drawing Sheets

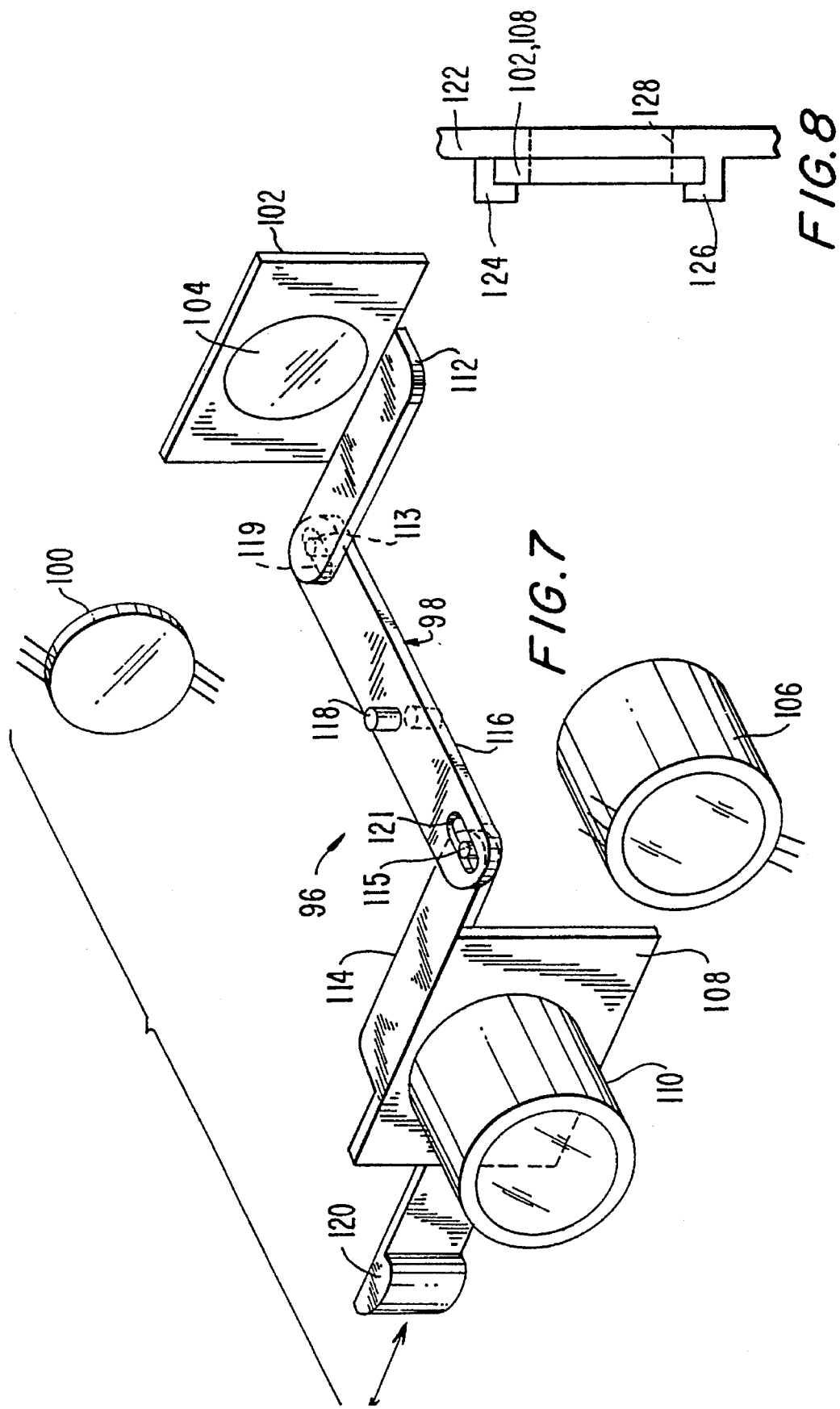

DUAL-PATH OPTICAL SYSTEM

This is a division of application Ser. No. 08/118,881 filed Sep. 9, 1993, now U.S. Pat. No. 5,469,293.

BACKGROUND OF THE INVENTION

1. Field of the Invention

This invention generally relates to dual-path optical systems and, more particularly, to dual-path optical systems that are pseudoscopic.

2. Description of the Prior Art

Dual-path optical systems are well-known in the optical arts and include two general classes of devices referred to as binocular and biocular. Binocular devices include any instrument in which both eyes are used to view an image to achieve stereoscopic effects or to facilitate observation. They are characterized by having two mechanically linked but optically uncoupled optical paths to provide separate twin inputs and outputs to the visual system. True stereoscopic perspective is, more or less, commonly present in such devices so that an observer's eyes see objects from slightly different points of view to permit the perception of depth and dimension. Prism binoculars, binocular magnifiers, and binocular microscopes are examples of such systems.

The most common biocular devices are those which are designed so that both eyes view an object through a single exit pupil, i.e., there is a single input and a twin output. They are different from binocular devices in that they contain elements that are common to both eyes. Examples of such devices include gunsights and general purpose night vision goggles such as those described in U.S. Pat. No. 4,392,710.

Other types of biocular systems provide for two eye viewing through different parts of different elements which themselves are arranged along a single optical axis. With such systems, images typically get inverted and reverted, so objects must be manipulated to provide normal image orientation to an observer.

In both binocular and biocular devices proper image orientation and stereoscopic perspective is normally desired and achieved through the use of elaborate erecting systems in conjunction with suitable objectives and eyepieces. For example, the erecting system commonly used in standard binoculars to achieve the stereoscopic effect and proper image orientation comprises double Porro prisms in conjunction with modified Erfle eyepieces and achromatic doublet objectives. Such systems are more or less expensive and difficult to fabricate because of the tolerances required in manufacture and alignment of the various components, especially the prisms.

Proper image orientation and stereoscopic perspective are not always the design goal with such systems. For certain applications such as in the study of the visual perceptual system, it is desirable to provide reversed left and right, or pseudoscopic, perspectives. However, such systems as the one evidenced by U.S. Pat. No. 3,655,264 issued on Apr. 11, 1972 to Theodore C. Pickett and entitled "BINOCULAR VIEWING DEVICE" for the same reasons appear to be no less complex and inexpensive than the typical stereoscopic counterpart.

Inexpensive binoculars are also known in the art. These typically comprise a pair of terrestrial telescopes, usually of Galilean form, whose elements are usually injection molded of optical plastics and aligned in plastic housings for purposes of reducing costs. Obviously, such systems suffer in performance and utility.

In view of the above, it is a primary object of the present invention to provide a dual-path optical system made of low-cost components that may be easily assembled and aligned.

It is another object of the present invention to provide a low-cost pseudoscopic dual-path optical system.

It is yet another object of the present invention to provide a low-cost pseudoscopic binocular system in which any differences in left and right image perspectives are not apparent to the user.

It is yet another object of the present invention to provide a low-cost monocular optical system in which a coupled plane mirror system is employed as an erecting system.

Other objects of the invention will be apparent and will appear hereinafter in the following detailed description.

SUMMARY OF THE INVENTION

Pseudoscopic, dual-path optical systems employing plane mirror arrangements for cross coupling the optical paths to reverse the left and right perspectives of object space are provided. Advantageously, the cross coupled path arrangements permit the systems to be manufactured inexpensively because low-cost reflective components can be used and assembled with alignment requirements that are significantly relaxed compared with customary requirements found in uncoupled systems utilizing high-cost prisms or mirror assemblies for similar purposes.

One of the embodiments of the invention comprises a low-cost pseudoscopic focusing binocular system of moderately high magnification in which the reversed left and right perspectives are not perceptually apparent to the user. Here, focusing is achieved through the use any number of simple mechanical arrangements for moving a mirror assembly, objective lenses, or eyepieces to simultaneously alter both dual path lengths and thus the overall optical path length of the system. Adjustment of interpupillary distance also is achieved through the use of simple mechanical means such as a linkage and slide arrangement.

The plane mirror systems of the invention may also be used in monocular systems as an intermediate between an objective and an eyepieces to provide an erecting function.

DESCRIPTION OF THE DRAWINGS

The structure and operation of the invention, together with other objects and advantages thereof, may best be understood by reading the detailed description in connection with the drawings in which reference numerals have been used throughout to designate the same part and wherein:

FIG. 7 is a diagrammatic perspective view showing a mechanical arrangement that can be used to adjust the interpupillary distance between the dual optical paths of the invention;

FIG. 8 is a diagrammatic side elevational view of a pair of grooves that may be formed in the side walls of a housing to cooperate with parts of the mechanical arrangement of FIG. 7.

DETAILED DESCRIPTION

This invention relates to pseudoscopic optical systems employing plane mirror arrangements for cross-coupling dual optical paths to reverse left and right perspectives of object space. Advantageously, the cross-coupled, dual-path arrangements permit the systems to be manufactured inexpensively because low-cost reflective components can be used and assembled with alignment requirements that are significantly relaxed compared with customary requirements found in uncoupled systems utilizing high-cost prisms or mirror assemblies for similar purposes. The inventive pseudoscopic optical system has the flexibility to be exploited for use in, for example and without limitation, pseudoscopes, binoculars, or microscopes. In addition, the mirror system of the invention may be used to provide an inexpensive function for a monocular system.

Figure 1:
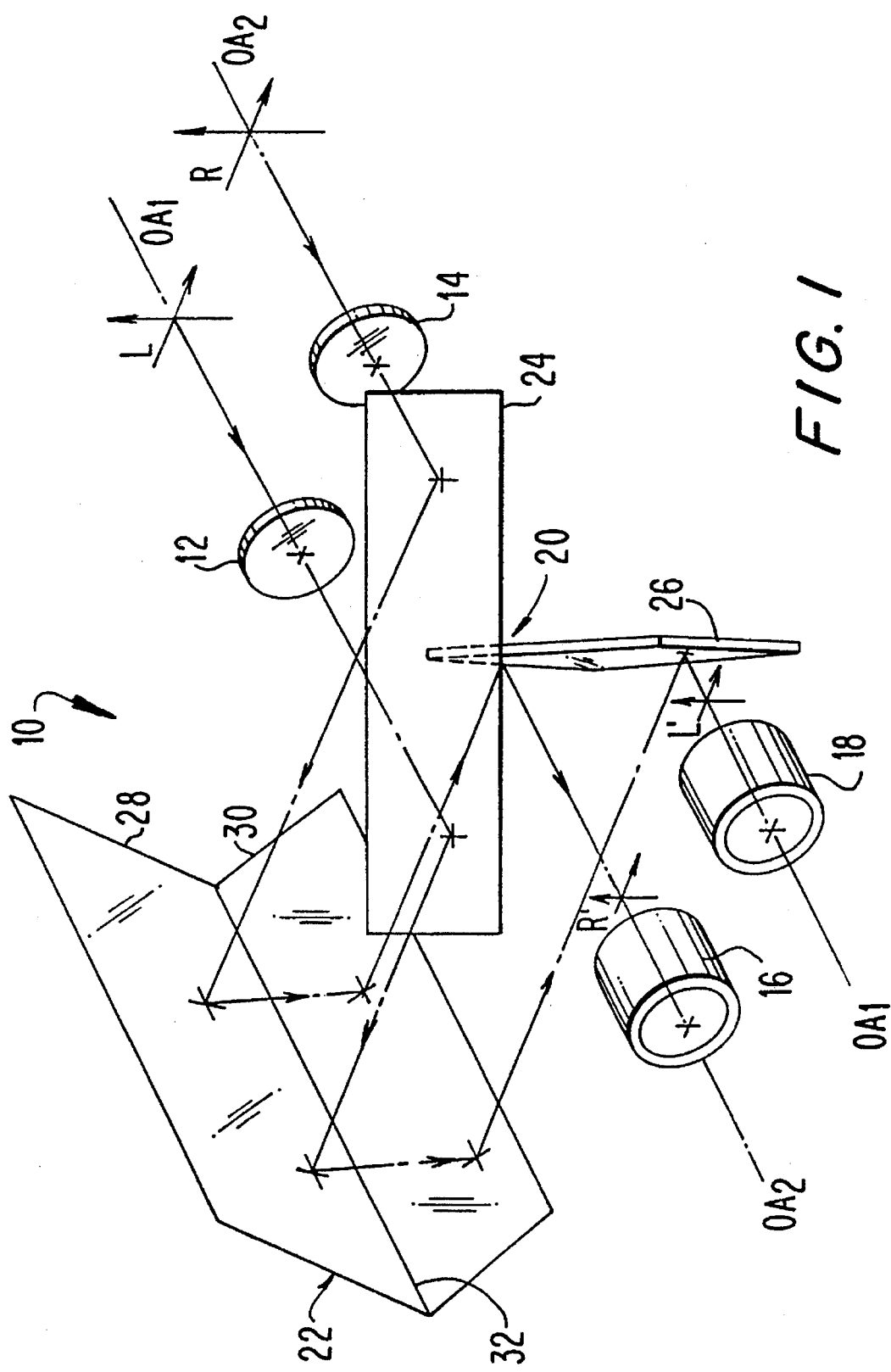
FIG. 1 is a diagrammatic perspective view of the dual-path optical system of the invention.

To best understand the invention, reference is now made to FIG. 1 where one embodiment of the invention is shown as the dual-path optical system designated generally at 10.

System 10 comprises a pair of objectives, preferably single-element dioptric or ophthalmic lenses, which can be purchased as off-the-shelf components from any ophthalmic lens wholesaler or, alternatively, easily and inexpensively injection molded to custom specification. One objective lens is provided along each optical axis $OA_1$ and $OA_2$, respectively. While low-cost ophthalmic refracting objectives are preferred for cost purposes, it should be clear to those in the optical arts that more complex refracting objectives may be used. In addition, it is perfectly possible to beneficially use purely reflecting or catadioptric objectives in place of the preferred ophthalmic objectives.

A pair of eyepieces or eye lenses, 16 and 18, are provided, one each corresponding to objectives, 12 and 14, to form objective-eyepiece pairs that are optically linked in a manner which will become apparent. Eyepieces 16 and 18 are preferably two-element, modified Ramsden forms but may be any other suitable type. As such, eyepieces, 16 and 18, also are inexpensive and easily fabricated.

In addition to its foregoing lenses, preferably six elements in all, system 10 comprises two mirror systems consisting exclusively of plane mirrors. The first plane mirror system is a crossed mirror system designated generally as 20, and the second is a roof mirror system designated generally as 22.

Crossed mirror system 20 comprises an upper plane mirror 24 and a lower plane mirror 26 located vertically beneath it. Mirrors 24 and 26 are located in planes that intersect one another at ninety (90°) with upper mirror intersecting optical axes, $OA_1$ AND $OA_2$, at forty-five degrees and lower mirror at minus forty-five degrees as seen from above.

Roof mirror system 22 also comprises upper and lower mirrors, 28 and 30, respectively, which intersect one another at ninety degrees along a longitudinally extending line 32 that is parallel to optical axes, $OA_1$ AND $OA_2$. However, it is to be understood that mirrors, 28 and 30, need not join one another along line 32 but may be contained narrower than shown and reside in planes that intersect one another substantially along line 32.

An observer using pseudoscopic, dual-path optical system 10 looks at object space along optical axes, $OA_1$ AND $OA_2$, which are separated horizontally and offset vertically, one above the other, as is readily apparent from FIG. 1. What the observer sees in using system 10 is a reversal in the left and right perspectives of object space. Left and right objects, designated L and R, are seen via eyepieces, 16 and 18, as corresponding images L' and R' that are reversed or "pseudoscopic". This perspective reversal is brought about by as a consequence of the action of mirror systems 20 and 22 in combination with the lenses of system 10.

More particularly, crossed mirror system 20 serves to fold the dual incoming optical paths of system 10, just after objectives, 12 and 14, by ninety degrees in the horizontal plane. These folded optical paths as indicated by the arrowheads in FIG. 1, feed the upper half (mirror 28) of mirror roof system 22, which in turn folds them by ninety degrees in the vertical plane to impinge on the lower half (mirror 30) of roof system 22. Lower mirror 30 folds both optical paths through ninety degrees, again the horizontal, where they proceed in a direction, opposite to that from which they entered roof system 22, toward lower mirror 26 of crossed mirror system 20 which, in turn, folds them again in the horizontal to provide the input branches to the Ramsden eyepieces, 16 and 18.

In system 10, objectives 12 and 14, form intermediate real images, L' and R', of object space just before the pair of Ramsden eyepieces, 16 and 18. These intermediate images are viewed via Ramsden eyepieces, 16 and 18, as magnified erect images, except that the right and left eye perspectives are reversed as a consequence of the erecting system. Because of this property, system 10 is referred to herein as being "pseudoscopic".

Because system 10 has internal image planes, masks may be placed at such planes for light control or field sizing, and the magnification and field of view may be set using conventional design techniques for this purpose. Magnification, as usual with visual instruments, is set by the ratio of the focal lengths of the objectives and eyepieces.

In addition to its low-cost because of the use of plane mirrors and low-cost lens components, system 10 is also readily assembled free of the usual alignment problems associated with the multicomponent optical systems employing reflective elements since its erecting function is shared among all of its mirrors with mirror misalignments being shared and hence unnoticeable. Therefore, manufacturing requirements and their attendant costs may be significantly relaxed compared with usual practices. However, it should be kept in mind that system 10 will be sensitive to twist between roof system upper and lower mirrors, 28 and 30, so care should be taken so these mirrors are twisted along their nominal planes. Fairly large angular errors in the position of upper and lower crossed mirrors, 24 and 26, may be tolerated. For example, it is possible that the accumulated rotational tolerances of these mirrors about their vertical axis of intersection could depart from nominal by between 0.5 and 1.0 degrees, the effect being a horizontal shift in the location of the left and right perspectives. However, such a shift is equal in both branches and, thus, self compensating. In terms of angular tilt, i.e., tilt about the long axis of the mirror, the permissible tolerance is a function of the difference between the vertical shift in the image plane preceding an eyepiece and the magnification of the eyepiece. Generally, this tolerance is one prism diopter.

System 10 may be used as a pseudoscope by arranging its magnification to be approximately 1.0, or it may be used for other purposes requiring higher magnifications such as in binocular, microscope, or in astronomical applications.

As shown in FIG. 1, objective lenses, 12 and 14, reside in a horizontal plane that is above the horizontal plane in which eyepieces, 16 and 18 reside, i.e., the two planes are vertically offset. It should be obvious that the locations of the objectives and eyepieces can be interchanged by simply interchanging the roles of upper and lower mirrors 24 and 26 through proper orientation. Put another way, objectives, 12 and 14, can be below eyepieces, 16 and 18, by rotating the cross mirror system 20 ninety degrees counter clockwise.

Figure 2:
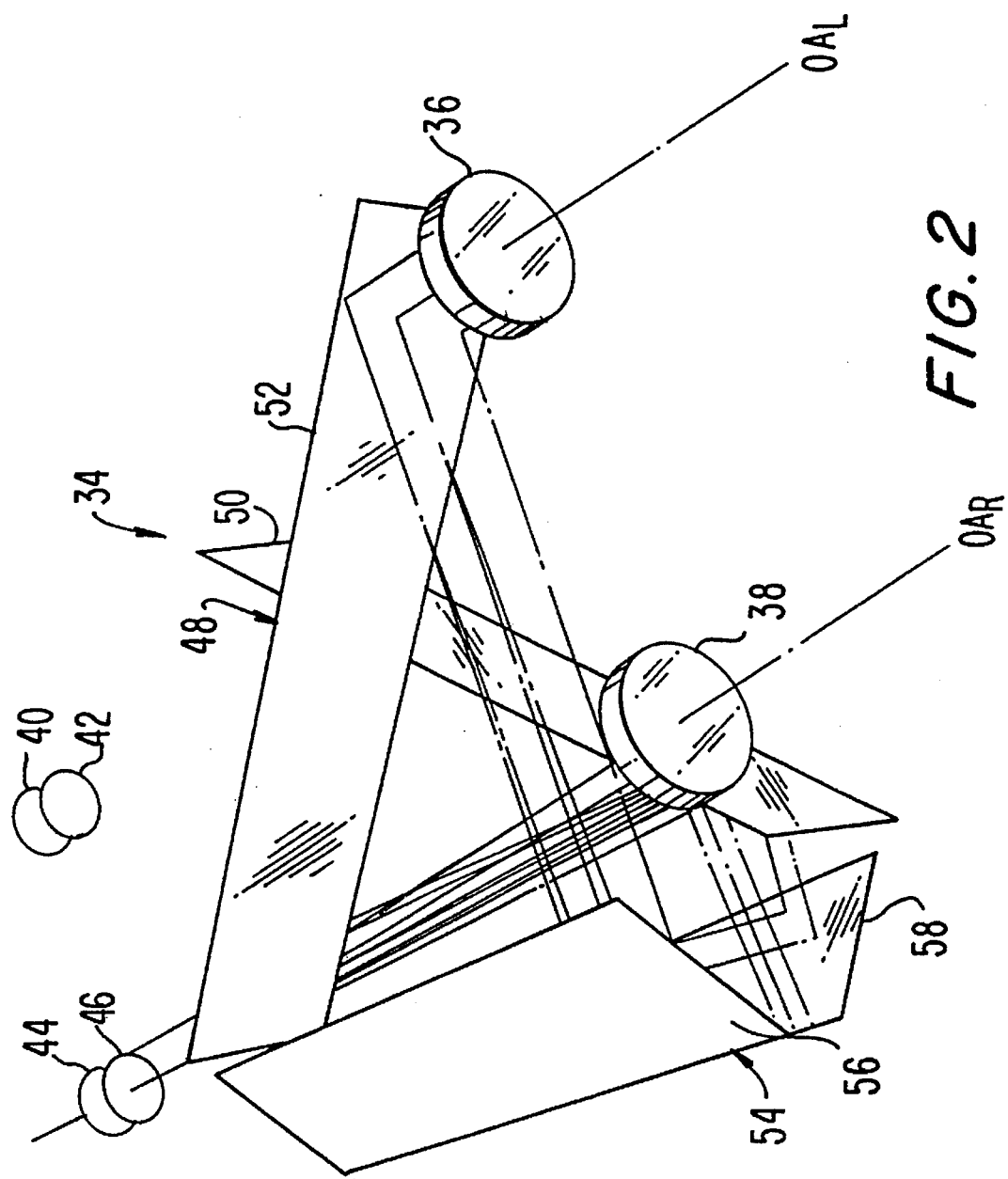
FIG. 2 is a diagrammatic perspective view of another embodiment of the dual-path optical system of the invention with the roles of handedness of its erecting system changed compared with the embodiment of FIG. 1.

Referring now to FIG. 2, there is shown a right handed embodiment of the invention, which is the system designated generally by the numeral 34. In FIG. 2, the perspective of the observer is from object space looking at the front of system 34. Like system 10, system 34 comprises a pair of objective lenses, 36 and 38, aligned, respectively, with optical axes, $OA_R$ and $OA_L$. There are two Ramsden eyepieces here as well each consisting of two elements. One is seen to consists of elements 40 and 42 and the other consists of elements 44 and 46.

The crossed mirror system of this embodiment is designated generally at 48 and the roof mirror system at 54. Crossed mirror system 48 consists of upper and lower plane mirrors, 50 and 52, respectively, and roof mirror system 54 consists of upper and lower plane mirrors, 56 and 58, respectively.

All of the components of system 34 may be the same as those of system 10. The major differences between the two embodiments is in the location of their roof mirror systems and the orientation of the upper and lower plane mirrors of their respective crossed mirror systems. In system 34, its roof mirror system 54 is to the right of right optical axis, $OA_R$, and the upper mirror 52 is positioned to intercept incoming rays and direct them to travel to the right as seen from the eyepieces. To do this, upper mirror 52 is set to be three-hundred and fifteen degrees as viewed from the top and looking forward. Lower mirror 50, accordingly, is set to be at forty-five degrees to perform its function. Hence, the crossed mirror system 48 here is rotated ninety degrees counter clockwise with respect to crossed mirror system 20 and the reflective faces have been "flipped" by one-hundred and eighty degrees.

Other than the "handedness" of the two embodiments of FIGS. 1 and 2, both embodiments are function and operate in a similar manner and share common cost and assembly features. Like system 10, the relative positions of the objectives and eyepieces can be interchanged so that the objectives can be lower than the eyepieces.

Figure 3:
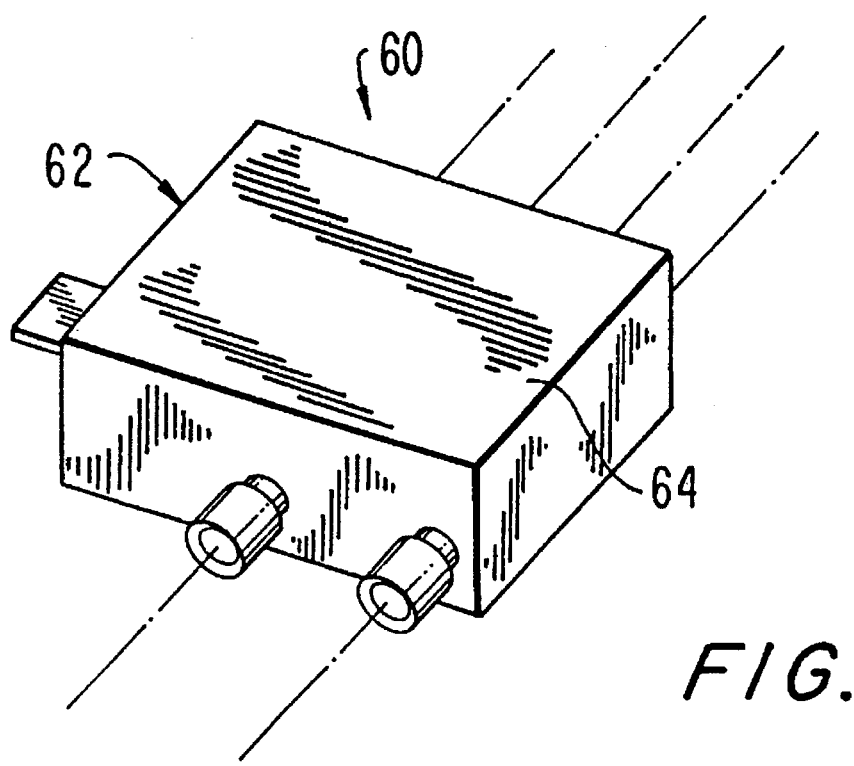
FIG. 3 is a diagrammatic perspective view of a pseudoscopic binocular system incorporating the optical system of the invention.
Figure 4:
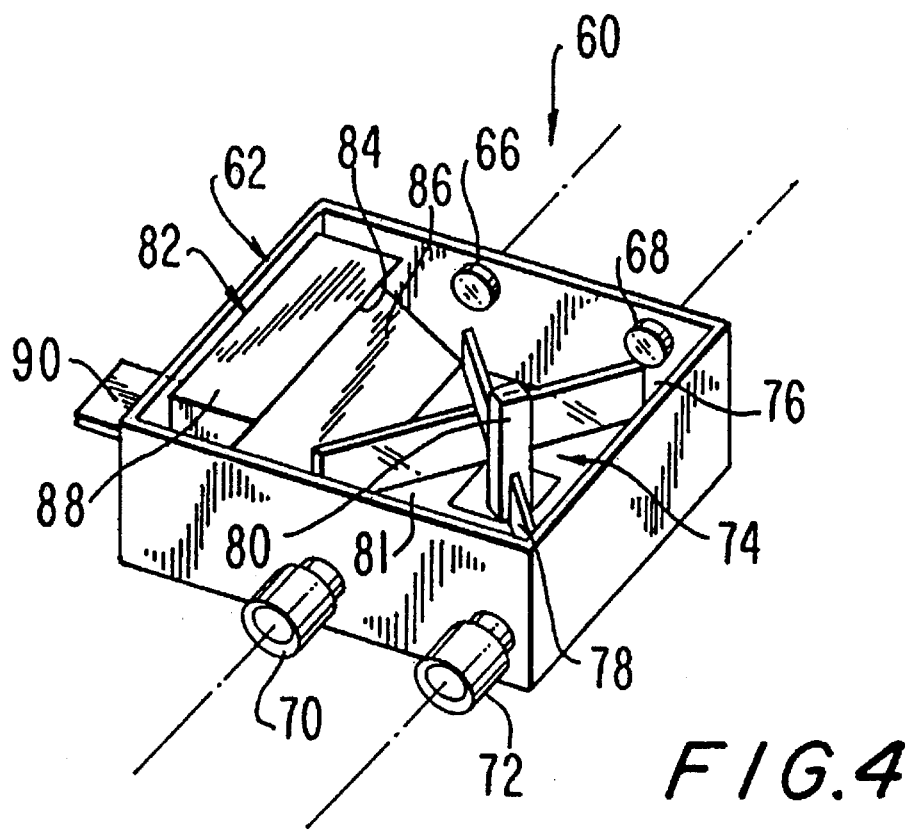
FIG. 4 is a diagrammatic perspective view of the binocular system of FIG. 3 with top portions removed to reveal the optical system.
Figure 5:
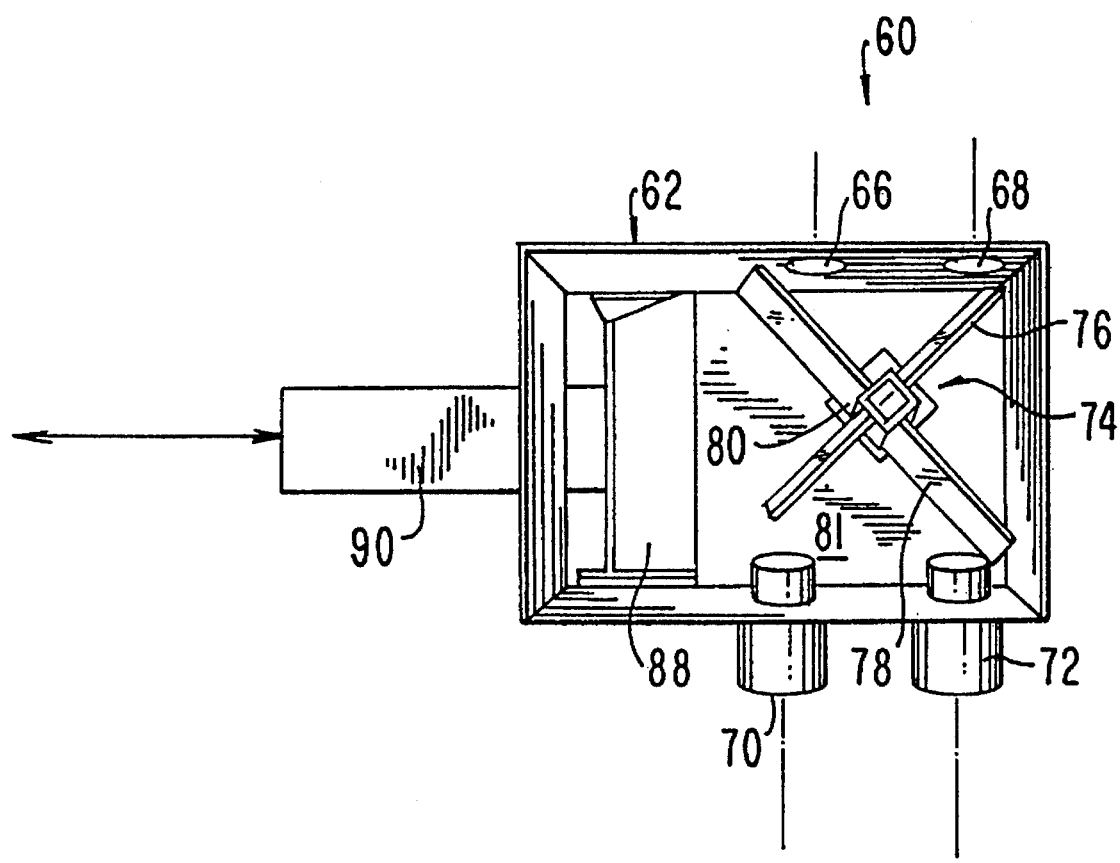
FIG. 5 is a diagrammatic top perspective view of the invention of FIG. 3 showing elements of its optical system and focusing arrangement.

One preferred embodiment of the inventive optical system is in the form of pseudoscopic, low-cost, binoculars such as those designated generally at 60 in FIGS. 3, 4, and 5.

As is well-known, binoculars usually consist of two prism erecting telescopes (called barrels) mechanically joined together in close alignment via a hinge pin about which they pivot, but otherwise optically uncoupled to provide two separate inputs and outputs. The hinge arrangement permits controlled separation of the two barrels to accommodate differences in interpupillary distances among users. The optical axes of the barrels must, within limits, be maintained parallel to provide true stereoscopic vision for depth perception.

In conventional binoculars, the erecting function is most usually provided by double Porros, which are expensive and need to be manufactured and mounted to rather precise accuracy and tolerance. Because of the complicated optical path encountered by light traveling through them, an error in a prism of this type may be magnified depending on where it originates in the system.

The present invention, unlike conventional binoculars, provides pseudoscopic vision at moderate magnifications without any apparent sensation that the left and right perspectives are reversed while at the same time preserving the virtues of simplicity of design and assembly. As can be appreciated from referring to FIGS. 1, 2, and 3, the binocular embodiment of the present invention is in the form of a low-cost, dual-path optical system which preferably uses simple optics and a unique arrangement of mirrors to provide the erecting function. In the present binocular embodiment, the inventive plane mirror arrangement is exploited to provide the erecting function, but each mirror is oversized and interacts with both optical paths. In doing so, the invention provides automatic alignment between the left and right eye paths and the erecting function. No prisms are required, and the mirrors are plane, front surface types of low-cost.

As can be seen, binoculars 60 comprise a housing 62 with a top 64. Housing 62 is preferably molded of dimensionally stable plastic that is compatible with the thermal expansion properties of the various optical components of binoculars 60. Top 64 may be made more or less removable, but preferably is sealed shut after assembly and alignment have been accomplished during manufacture.

As best seen in FIG. 4, binoculars 60 comprise a pair of objectives, 66 and 68, which, again, can be dioptric or ophthalmic lenses, which can be purchased off-the-shelf from any ophthalmic lens wholesaler or alternatively easily and inexpensively injection molded to custom specification. One is provided for each eye. As before, objectives, 66 and 68, form intermediate images of the scene just before a corresponding pair of Ramsden eyepieces, 70 and 72, which are comprised of two elements, also inexpensive and easily fabricated of plastic. The intermediate images are viewed via Ramsden eyepieces, 70 and 72, as magnified erect images of the object, except that the right and left eye perspectives are reversed as a consequence of the erecting system. Because of this property, which does not apparently affect the appearance of the observed scene, the inventive binoculars are also termed "pseudoscopic".

The crossed mirror system of binoculars 60 is designated generally at 74 and is seen to comprise upper and lower mirrors, 76 and 78, respectively, which are mounted in a vertically extending, slotted post 80 preferably fixedly attached to a bottom wall 81 of housing 62. Mirrors, 76 and 78, may be fixed in place in post 80 by any well-known conventional means as, for example, through the use of epoxy or any well-known snap fastener or spring loading arrangement. Post 80 is preferably fabricated so that mirrors, 76 and 78, can be precisely positioned an aligned with respect to it and one another. Also, post 80 is preferably made sufficiently rigid so that it and mirrors, 76 and 78, move as a unit, and not with respect to one another, under the influence of external forces as those which may be transmitted to them via housing 62. In this manner, mirrors, 76 and 78, can be accurately positioned and aligned on post 80 prior to being fixed in housing 62. Thereafter, mirrors, 76 and 78, are isolated from any movement within housing 62 that would change their alignment, at least with respect to one another.

The roof mirror system of binoculars 60 is designated generally at 82 and comprises a mirror mount 88, preferably itself fabricated of molded plastic, in which are mounted upper and lower plane mirrors, 84 and 86, respectively. Each plane mirror, 84 and 86, is preferably mounted within mount 88 on three-point suspension systems to provide proper alignment. Here again, the mirror mounting arrangement permits mirrors, 84 and 86, to be accurately aligned with respect to one another while being mechanically isolated from movement in housing 62, which movement otherwise would tend to be transmitted directly to them to alter their relative positions.

Mount 88 is structured and arranged with respect to housing 62 so that it can be slide along bottom wall 81, toward and away from crossed mirror system 74, to adjust focus by changing the optical path length from objectives, 66 and 68, to the position of the intermediate images. For this purpose, a tab 90 is attached to mirror mount 88, extending outside of housing 62, so that movement (double arrows in FIG. 5) of tab 90 by a user is directly transmitted to mount 88 thereby allowing binoculars 62 to be focused.

Obviously, other mechanical means can be used to adjust focus. For example, the relative positions of the objectives and/or eyepieces might also be changed in concert for this purpose. Again, magnification of binoculars 62 may be any sensible value as set by the ratio of focal lengths of the objectives and eyepieces.

EXAMPLE OF BINOCULAR

Figure 6:
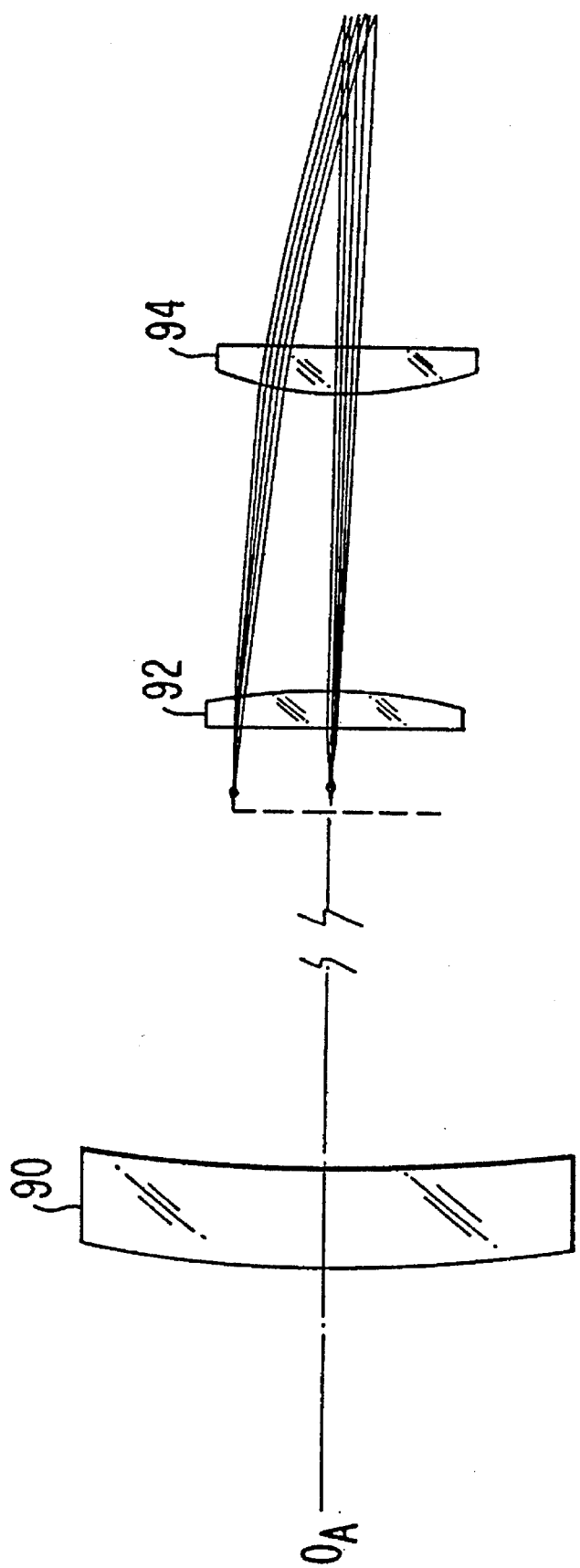
FIG. 6 is a diagrammatic elevational view showing the various components of the optical system of the invention as they exist unfolded along the optical axis which has been broken.

A specific example of an optical system according to the invention that is suitable for use as binoculars is now given with reference to FIG. 6. FIG. 6 shows an unfolded version of the example and is seen to comprise a meniscus objective 90 followed by an eyepiece comprising two elements 92 and 94.

Objective 90 is made of acrylic having an index of refraction of 1.4917. Its clear aperture is 19.0 mm, its front convex surface radius is 55.79 mm, and its back concave surface radius is 88.33 mm. Its axial thickness is 4.0 mm.

Element 92, which is the eyepiece field lens, is a plano-convex lens also made of acrylic. It has a front plano surface and a rear convex surface with a radius of 30.00 mm. Its axial thickness is 2.0 mm.

Element 94, which is the eyepiece eye lens, is a biconvex lens that is 3.0 mm thick on-axis. It is made of acrylic with a front surface radius of 17.20 mm and a rear surface radius of 115.00 mm.

The axial separation between the rear surface of element 90 and the front surface 92 is 293.26 mm. The intermediate image formed by the objective is forward of the front surface of element 92.

The axial separation between the rear surface of element 92 and the front surface of element 94 is 16.78 mm with the exit pupil of the system, approximately 1.5 mm in diameter, being formed 18.49 mm behind the last surface of the system.

The lateral magnification of this system is 11.59. Its design wavelength was 0.588 microns.

OTHER BINOCULAR EXAMPLES

For binoculars with a magnification of about 9.5, a suitable objective would have a focal length of about 250 mm while the eyepiece would have a focal length of about 26.32 mm. For a magnification of about 6.7, the objective focal length would be about 267 mm and the eyepiece focal length about 39.85 mm. Other examples are well within the imagination of those skilled in the optical arts. The real field of view depends on the focal length of the objective and the field of view of the eyepiece as modified by any intervening masking in the optical path.

ADJUSTMENT OF INTERPUPILLARY DISTANCE

Adjustment of the interpupillary distance between the eyepieces of the foregoing inventive optical systems is highly desirable and may be achieved by the mechanical arrangement illustrated in FIG. 7. As seen FIG. 7, there is an optical system 96 which comprises objective lenses 100 and 104. Objective 100 is fixed in place, as in a housing, and objective lens 104 is mounted in a slide 102.

System 96 also has a pair of eyepieces 106 and 110. Eyepiece 106 is also fixed in place like objective 100 while eyepiece 110 is mounted in a slide 108 similar in design and function to slide 102.

Extending from slides 102 and 108 are tabs 112 and 114, respectively. A post 113 extends downwardly from tab 112, and a post 115 extends upwardly from tab 114.

Extending between posts 113 and 115 is a link 116 that is mounted for rotation about a pivot 118, which may be formed at the midpoint between the mirrors of the crossed mirror system of the invention. However, the crossed mirror system is not shown here so that the interpupillary adjustment may be more clearly visualized. In the extreme end portions of rotatable link 116 are formed two slots, 119 and 121, for slidably engaging with posts, 113 and 115, respectively.

A push button 120 is fixedly attached to slider 108 to impart motion to it as indicated by the double-headed arrow. To guide slider 108 and 102, they may be mounted in a pair of grooves formed by opposing brackets 124 and 126 in conjunction with the rear surface of a housing wall 122 as shown in FIG. 8. Here, an aperture 128 is provided to be in alignment with the systems optical axes.

Configured in this manner, movement of slide 108 is transmitted to slide 102 so that the two move in concert in opposite directions to adjust interpupillary distance. Obviously, such a mechanical arrangement may be used with any of the embodiments so far discussed. Other arrangements will occur to those skilled in the mechanical arts.

MONOCULAR SYSTEM

Figure 9:
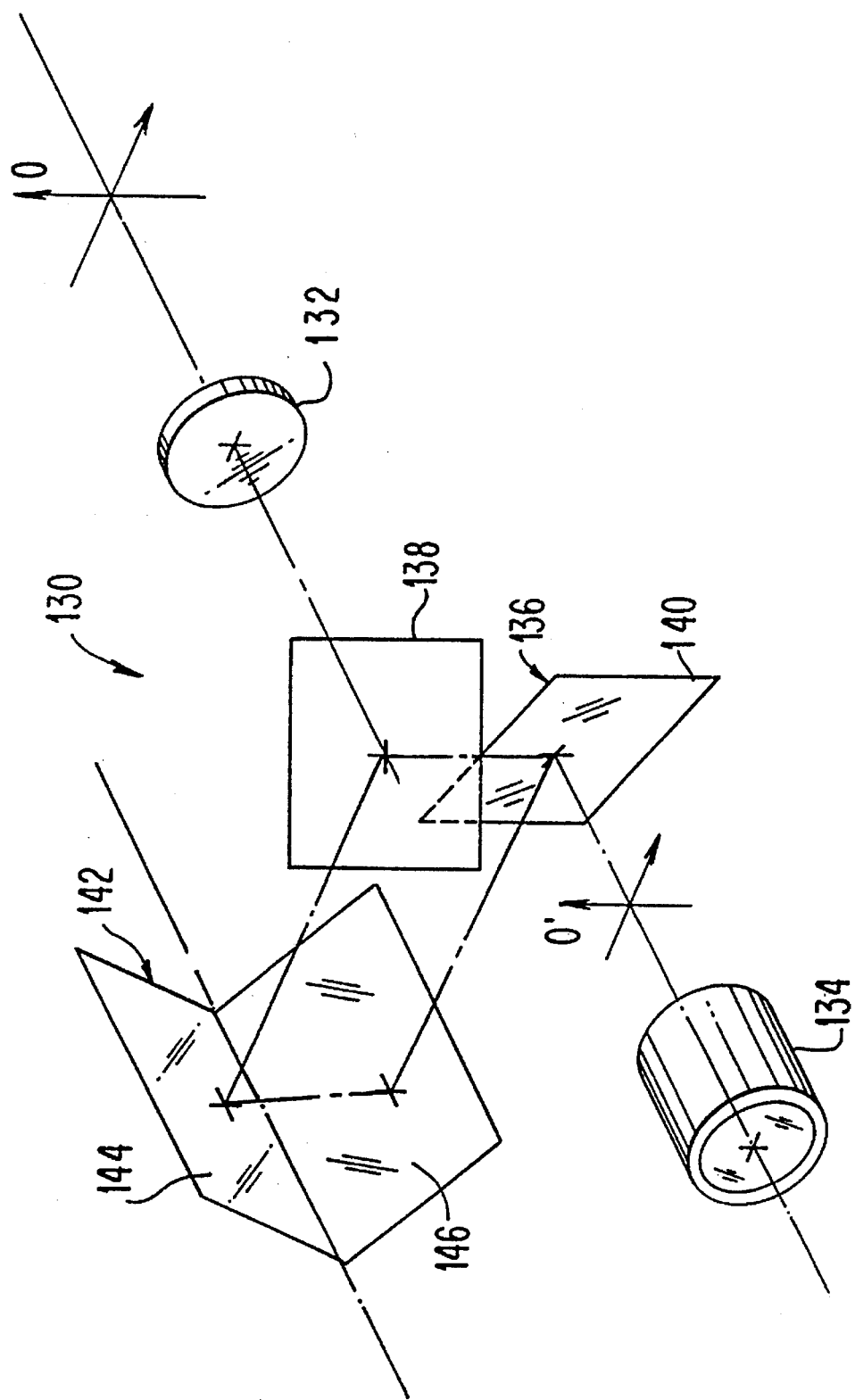
FIG. 9 is a diagrammatic perspective view of monocular system employing the plane mirror erecting system of the invention.

The inventive mirror system of the invention may be adapted for use in a monocular version to provide an image erection function. Such a system is shown in FIG. 9 where it is designated generally at 130.

System 130 comprises one objective 132, one eyepiece 134, an uncoupled, crossed mirror system 136, and a roof mirror system 142. Crossed mirror system consists of upper and lower plane mirrors, 138 and 140, respectively, and roof mirror system consists of upper and lower plane mirrors, 144 and 146, respectively. Here, an image O' of an object O is formed by the objective 132 and an erect and unreverted image just forward of eyepiece 134. However, here there is obviously no cross coupling among dual optical paths because they simply do not exist in the monocular application. Focusing here may be achieved by simply mechanically moving the roof mirror system as before.

Those skilled in the art may make changes to the invention without departing from the scope of its teachings. Therefore, it is intended that the embodiments described herein be considered as illustrative and not be construed in a limiting sense.

What is claimed is:

1. A dual-path, pseudoscopic optical system comprising:
   a pair of objectives including fight and left objectives arranged along separate optical axes that are spaced apart from one another by a predetermined distance;
   a pair of eyepieces including right and left eyepieces arranged, respectively, along a pair of rearwardly extending optical axes that are vertically offset with respect to said optical axes of said objectives;
   a cross-coupled mirror system configured and arranged with respect to said pairs of objectives and said eyepieces to form pseudoscopic images of an object space which can be viewed via said eyepieces with the image formed by said fight objective being viewed through said left eyepiece and the image formed by said left objective being viewed through said fight eyepiece; and
   means for adjusting an interpupillary distance between said eyepieces, said means for adjusting an interpupillary distance between said fight and left eyepieces is structured and arranged to move one of said eyepieces and one of said objectives in equal and opposite directions while keeping the other of said eyepieces and said objectives stationary.

2. The dual-path optical system of claim 1 wherein said objectives comprise purely refracting elements.

3. The dual-path optical system of claim 1 wherein said cross-coupled mirror system is comprised exclusively of plane mirrors.

4. The dual-path optical system of claim 1 wherein each of said objectives comprises a single element positive dioptric power lens.

5. The dual-path optical system of claim 1 wherein said eyepieces are in the form of modified Ramsden eyepieces.

6. The dual-path optical system of claim 1 wherein said right and left objective and eyepiece lenses are molded of optical plastics.

7. The dual-path optical system of claim 1 further including means for focusing.

* * * * *